(12) United States Patent
Zwahlen

(10) Patent No.: US 11,565,297 B2
(45) Date of Patent: Jan. 31, 2023

(54) BENDING MACHINE AND METHOD FOR CONTROLLING THE BENDING MACHINE

(71) Applicant: Häusler Holding AG, Duggingen (CH)

(72) Inventor: Alexander Zwahlen, Langenbruck (CH)

(73) Assignee: HÄUSLER HOLDING AG, Duggingen (CH)

( * ) Notice: Subject to any disclaimer, the term of this patent is extended or adjusted under 35 U.S.C. 154(b) by 123 days.

(21) Appl. No.: 16/661,616

(22) Filed: Oct. 23, 2019

(65) Prior Publication Data

US 2020/0122212 A1    Apr. 23, 2020

(30) Foreign Application Priority Data

Oct. 23, 2018    (DE) .................. 10 2018 126 336.8

(51) Int. Cl.
*B21D 5/14*    (2006.01)
*B21D 5/00*    (2006.01)
*B21D 5/06*    (2006.01)
*G05B 13/02*    (2006.01)

(52) U.S. Cl.
CPC .............. *B21D 5/14* (2013.01); *B21D 5/004* (2013.01); *B21D 5/06* (2013.01); *G05B 13/021* (2013.01); *G05B 13/024* (2013.01); *G05B 2219/36203* (2013.01); *G05B 2219/49184* (2013.01)

(58) Field of Classification Search
CPC .......... B05B 2219/36203; B05B 2219/45143; B05B 2219/49184; B21D 5/004; B21D 5/14; B21D 5/06; B21D 5/006; G05B 2219/36203; G05B 2219/45143; G05B 2219/49184

USPC ................ 72/7.1, 7.2, 7.4; 700/165
See application file for complete search history.

(56) References Cited

U.S. PATENT DOCUMENTS

| | | | | |
|---|---|---|---|---|
| 3,906,765 A | * | 9/1975 | Foster | G05B 19/4163 72/8.9 |
| 4,796,449 A | * | 1/1989 | Berne | B21D 5/14 72/8.3 |
| 5,187,959 A | * | 2/1993 | Davi | B21D 5/14 72/10.6 |
| 6,044,675 A | * | 4/2000 | Davi | B21D 5/14 72/173 |

(Continued)

FOREIGN PATENT DOCUMENTS

| | | | |
|---|---|---|---|
| CN | 108787804 A | * 11/2018 | ............. B21D 5/004 |
| DE | 2551944 A1 | 5/1976 | |

(Continued)

OTHER PUBLICATIONS

Office Action received for European Patent Application No. 19204629.0, dated Mar. 15, 2021, 9 pages (5 pages English translation & 4 pages original).

(Continued)

*Primary Examiner* — Adam J Eiseman
*Assistant Examiner* — Matthew Stephens
(74) *Attorney, Agent, or Firm* — Workman Nydegger

(57) ABSTRACT

A method and a correspondingly configured bending machine are described, wherein a setting of the bending machine is first calculated on the basis of a mathematical model and subsequently corrected on the basis of stored data sets on previous bending operations and their correction values.

9 Claims, 3 Drawing Sheets

(56) References Cited

U.S. PATENT DOCUMENTS

Figure 1:
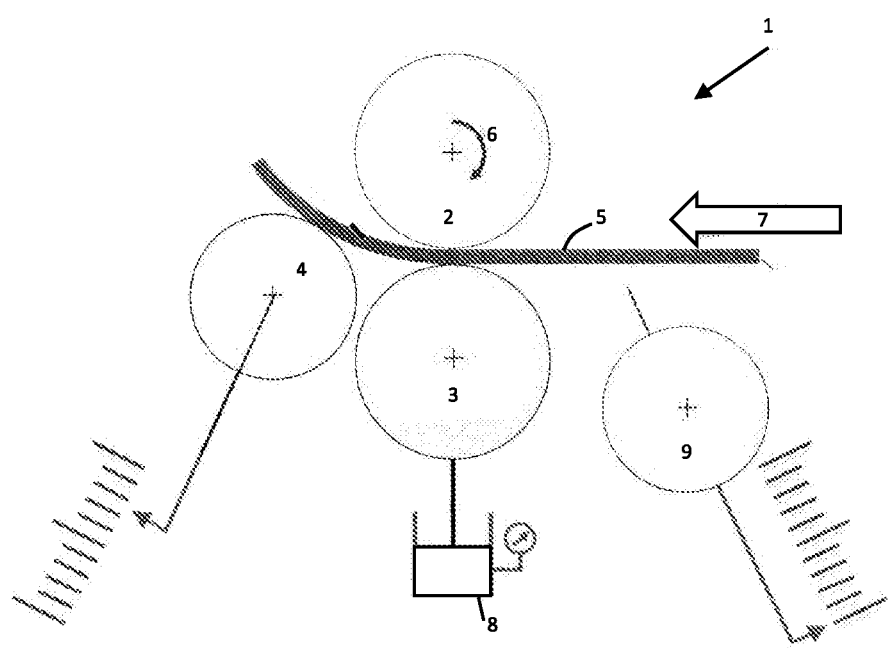

| | | | | |
|---|---|---|---|---|
| 6,256,547 B1* | 7/2001 | Tognon | ................ | G06F 19/00 |
| | | | | 700/97 |
| 2011/0094278 A1* | 4/2011 | Caporusso | ............ | G05B 19/19 |
| | | | | 72/17.3 |
| 2017/0157660 A1* | 6/2017 | Sasaki | .................... | B21D 5/14 |
| | | | | 72/10.6 |
| 2018/0133772 A1* | 5/2018 | Fabianek | ................ | B21D 5/14 |
| | | | | 72/10.6 |

FOREIGN PATENT DOCUMENTS

| | | |
|---|---|---|
| DE | 136458 | 7/1979 |
| DE | 69703580 T2 | 3/2001 |
| EP | 1308223 A2 | 5/2003 |
| JP | 2011-062738 A | 3/2011 |

OTHER PUBLICATIONS

European Search Report and Search Opinion Received for EP Application No. 19204629.0, dated Mar. 25, 2020, 7 pages (Original Document Only).

Intention to Grant received for Japanese Patent Application No. 19204629.0, dated Mar. 11, 2022, 6 pages.

Decision to grant received for European Patent Application No. 19204629.0, dated Jun. 17, 2022, 2 pages.

* cited by examiner

BENDING MACHINE AND METHOD FOR CONTROLLING THE BENDING MACHINE

The invention relates to a bending machine and method for controlling a bending machine, in particular a sheet metal bending machine for bending a sheet, wherein the bending machine has at least one upper roller and one lower roller and a positionable side roller.

The bending of large sheets into formed parts, which are subsequently inserted into a larger part, is typically carried out by sheet metal bending machines. As part of such a bending operation, a sheet to be bent is usually fed into such machines from one side and passed through the rollers of the bending machine, which are positioned so they forcibly bring the sheet into a desired shape as accurately as possible. The shape of the sheet after it has been bent, i.e. the radius of the curvature, depends essentially on the settings of the bending machine on the one hand, in particular the geometry of the rollers to each other, and on the material and other properties of the sheet to be bent on the other hand.

Typically, but not necessarily, a fed sheet has substantially the temperature of its environment so that the bending of the sheet is a cold deformation process. Although the embodiments of the invention described below assume such a cold sheet, the method and the corresponding controller should not be limited thereto.

For the bending of sheets, different presses, for example bending presses, as well as embossing machines and so-called round bending machines are known from the prior art. The respective method as well as the controller are described below on the basis of a so-called round bending machine, in particular a bending machine with 4 cylinders/rollers, with which typically a metal sheet or a sheet panel can be bent from a larger to a smaller radius or from a smaller to a larger curvature.

The round bending machines described here work according to the rounding roller method known in and of itself and have at least three and, in a particularly preferred embodiment, four rollers. The sheet to be bent is clamped between two rollers, of which at least one is driven by a motor, so that the clamped sheet can be moved by rotating the rollers. To bend the sheet, a bending force is exerted on the sheet by means of at least one of the further rollers. Depending on the geometric arrangement of the rollers and the properties of the sheet, this sheet can be moved by means of at least one of the driven rollers between the rollers of the bending machine so that the sheet is bent across its length. The smallest possible bending radius is limited by the diameter of the roller arranged in the bending direction, for example, the upper roller.

Modern bending machines, in particular machines for bending large sheets, which require considerable force to be bent and to achieve the most accurate bending result, can have a so-called CNC controller (computerized numerical control), i.e. a computer-based numerical control. This control is typically able to control the rollers and their geometric arrangement and/or determine the necessary settings of the bending machine necessary for a desired bending result and adjust them accordingly.

A typical problem with the round bending of large sheets is the deviation of the deformation that is actually achieved from the desired deformation. Such deviations may be caused by the fact that the actual material properties of the sheet, for example the bending strength and/or the limit between an elastic and a plastic deformation, deviates from the one that was used as the basis for the calculation of the settings of the bending machine.

It is known that the material properties relevant for the bending operation can differ significantly between sheets and especially between different batches of sheets. As a result, the bending radius obtained after the bending operation deviates greatly from the desired or expected radius if, in the calculation of the bending machine settings, the underlying material or bending properties of the sheet deviate significantly from the actual properties of the sheet that was bent. If, after a bending operation, the radius obtained is too large, it can be corrected in a further bending operation with a correspondingly parameterized bending machine. However, too small a bending radius can often not be corrected with an economically justifiable effort. For this reason and because bending machines are often not designed with regard to the bending forces, the bending of a sheet to a desired bending radius in only one bending step, i.e. with only one parameterization of the bending machine, is hardly possible.

In order to produce as little waste as possible during the bending of the sheets, sheets with partially unknown or greatly varying material properties are bent in small steps, i.e. iteratively. The sheet to be bent is guided several times through the bending machine with the machine settings relevant for the deformation of the sheet being changed between runs. Such a method for bending a sheet in several steps is also called a multi-pass method. Starting from an original curvature of the sheet to be bent, which means that the sheet can be flat as well, the settings of the bending machine in a multi-pass operation are changed so that the sheet is bent a little further towards the desired deformation without over-bending the sheet, i.e. producing a curvature that is too great. In a typical bending operation, the planar or already bent sheet is bent in several steps from a small curvature to a smaller bending radius, i.e. a greater curvature, with the next bending step being chosen so that the sheet is not bent to an overly small curvature, i.e. that it is over-bent, since it is hardly possible to bend the sheet back to a larger radius (in an economical manner).

At the same time, bending is to be performed with such a multi-pass method and a finite number of bending passes so that the bending of the sheet from its original to a desired curvature is economically possible in a limited time and at the same time the desired bending or curvature radius with a possible high precision is achieved. The settings of the bending machine, in particular for the successive bending operations in a multi-pass bending operation, are consequently to be determined in such a way that the desired bending radius is achieved with as few bending operations as possible, and a high degree of precision is achieved.

This is achieved by a control method or a correspondingly configured bending machine according to the independent claims.

Below, the invention will be explained in more detail with reference to drawings, which show FIG. 1 a bending machine in a schematic representation, FIG. 2 a flow chart for determining the settings of the bending machine, FIG. 3 a schematic representation of stored data on bending operations.

FIG. 1 shows a schematic section of the rollers of a bending machine. The bending machine 1 comprises at least one upper roller 2, one lower roller 3 and at least one first side roller 4.

Optionally, and particularly preferably, the bending machine may have a second side roller 9 whose position can be determined independently of the position of the upper and lower rollers and the first side roller 4.

The lower roller 3 and the upper roller 2 may be positioned to each other so that they clamp a sheet. At least one of the two rollers 2, 3 is driven by a motor so that they can rotate a sheet 5 clamped between an upper and a lower roller 5. In the figure, the direction of rotation of the motor-driven upper roller 2 is illustrated by the arrow 6. In an alternative embodiment, the lower roller 3 may be driven by a motor. A sheet 5 clamped between the upper and lower rollers can therefore be moved with a corresponding rotation of the rollers in the feed direction, see arrow 7, or counter to the feed direction by the rotation of the upper and lower rollers.

The sheet 5 to be bent can be clamped by applying contact pressure with the sheet which is clamped between the lower roller 3 and upper roller 2. This contact pressure, which is applied here on the underside of the sheet by means of the pressure cylinder 8, causes increased friction of the sheet to be bent between the upper and lower rollers so that the sheet can be moved in a conventional manner depending on this pressure and the friction coefficient between the sheet and the driven roller(s).

To bend the sheet by means of a bending machine, the sheet 5 is guided between the rollers so that the forces for deforming the sheet can be applied via the rollers. As described above, the movement can be carried out by the upper and/or lower roller 2, 3 or these rollers in cooperation with other rollers clamping the sheet and moving the same when the rollers are driven accordingly. In an embodiment (not shown), the clamping of the sheet may also take place between three or even further rollers, of which at least one is driven, so that the sheet can be moved by it. In a further embodiment not shown here, none of the rollers are driven by a motor. In this case, the sheet is moved between the rollers by another device, which is not shown.

The force required for bending the sheet is applied to the sheet 5 by at least three rollers. The at least three rollers are positioned geometrically and in consideration of the properties of the sheet so that the sheet can only be moved through the rollers when the sheet is deformed. Typically, the rollers 2, 3, 4 and optionally 9 can be positioned, for example traversed and/or adjusted, in their respective position to each other so that the relative position of the rollers can be adapted to the requirements of a bend. For a bending operation, the at least three rollers are thus to be positioned relative to one another in such a way that, taking into account the properties of the metal sheet, they bring about the desired bending of the metal sheet.

FIG. 1 shows a sheet 5, which is fed into the bending machine 1 in the direction of the arrow 7. In this embodiment, the sheet is clamped between the upper roller 2 and the lower roller 3. The upper roller 2 is driven by a motor, see arrow 6, and accordingly moves the sheet 5 to the side roller 4. This roller can be positioned relative to the upper and the lower roller and placed so that the sheet comes in contact with the side roller 4 when it is moved in its direction, as the upper and the lower roller exert a force onto the sheet and the sheet bends, so that the sheet can only be moved in the direction of the side roller 4 by being deformed. Since, in this case, the sheet 5 is bent on the outlet side of the bending machine 1, i.e. on the side on which the sheet leaves the bending machine but not on the inlet or feed side, the bending shown in FIG. 1 is a so-called out-bending.

Below, the method for determining the settings of the bending machine and the bending machine itself will be described with reference to the out-bending described above. The bending machine and the method should not, however, be limited to out-bending but are equally applicable to in-bending.

As mentioned above, the bending of the sheet depends, in addition to the properties of the sheet to be bent, essentially on the geometrical arrangement of the rollers relative to each other, in particular on the positioning of the side roller 4 relative to the position of the upper and lower rollers 2, 3. It can be seen that the bending radius becomes larger as the distance of the side roller from the upper and lower rollers increases.

Furthermore, it is known that the plastic deformation of a sheet depends not only on the geometric arrangement of the rollers but also on its geometric dimensions and the material properties of the sheet. Consequently, these factors must be taken into account when determining the settings of the bending machine if the intended bending of the sheet is to be achieved as accurately as possible during a bending operation.

The method for determining the settings of the bending machine is carried out by means of a controller, which typically comprises a digital signal processor and a memory for storing data. The controller is connected to the bending machine so that the machine can be adjusted according to the determined machine settings. To determine the settings of the bending machine, the controller executes a program, which may be implemented in software. This program implements the method described below in the form of executable instructions, which determines the settings of the bending machine based on the properties of a bending roller machine 1 to be controlled and the properties of the sheet to be bent.

The method for calculating the settings of the bending machine takes into consideration, among other things, the stress-strain curve, which describes an elastic deformation according to Hooke's Law and a plastic deformation of the sheet according to the Lüders strain and the subsequent equal strain. Such a method is known from the German patent application with the file number DE 10 2017 122 073.9.

Typically, a sheet to be bent is bent in several bending operations from its original planar shape or its previous radius of curvature to a target curvature, i.e. to a desired radius. In such a method, which is also called multi-pass, a sheet is accordingly bent in a first bending operation from an initial curvature or its planar shape to another curvature. The bending machine is adjusted accordingly, i.e. the rollers of the bending machine are positioned accordingly. In a further bending operation, the sheet can then be bent to a further curvature, wherein the rollers of the machine are positioned accordingly for the respective further bending process. In this way, a sheet can be bent in a multi-pass bending operation in several steps from an initial curvature or its planar shape to a desired (target) curvature with the bending machine being adjusted accordingly for each bending operation.

In a typical multi-pass bending operation, a sheet can be bent to a larger curvature in iterative successive bending operations. In a preferred embodiment, the change in curvature in a bending operation corresponds to the total desired change in curvature divided by the desired total number of bending operations. The change in the curvature can therefore be essentially determined in a preferred embodiment for the first and all subsequent bending operations prior to the first bending operation, wherein the respective change for the bending operations is equal in each case based on the curvature prior to the first bending operation. This way, the sheet can be bent to its desired curvature in several equal steps.

The positions of the rollers of the bending machine are calculated depending on the particular curvature to be achieved in the next bending step by means of a method, for example the method mentioned above. Alternatively, any other calculation method may be used for this purpose.

In such a multi-pass bending operation, it was found that the material properties of the sheets relevant for a bending operation vary. The material properties vary in particular across different batches of sheets, i.e. the material properties of sheets of one batch are comparable while the material properties of different batches differ from each other. A batch, also called lot or series, of sheet metals refers to a group of sheets that were produced, for example, in a production run of a foundry or a rolling mill and that are based on the same casting so that the chemical composition of the metal is (almost) identical or similar in terms of the bending properties. In this context, a batch of sheets should be characterized in that they have identical or at least similar bending properties.

Since the material properties of sheets of different batches vary and since therefore the bending properties of the sheets vary as well, sheets from different batches have different curvatures after a bending operation when using the same setting for the bending machine so that the identical settings of a bending machine for sheets of different batches lead to different curvatures. The settings of the bending machine, i.e. the positions of the rollers of the bending machine, must therefore be different for different batches of sheets so that the same curvature can ultimately be achieved.

It was found as well that in multi-pass bending operations, the parameters calculated for the bending machine must be corrected by a given factor even if the specific properties of a batch of sheets was taken into account in the calculation of the parameters of the bending machine.

Figure 2:
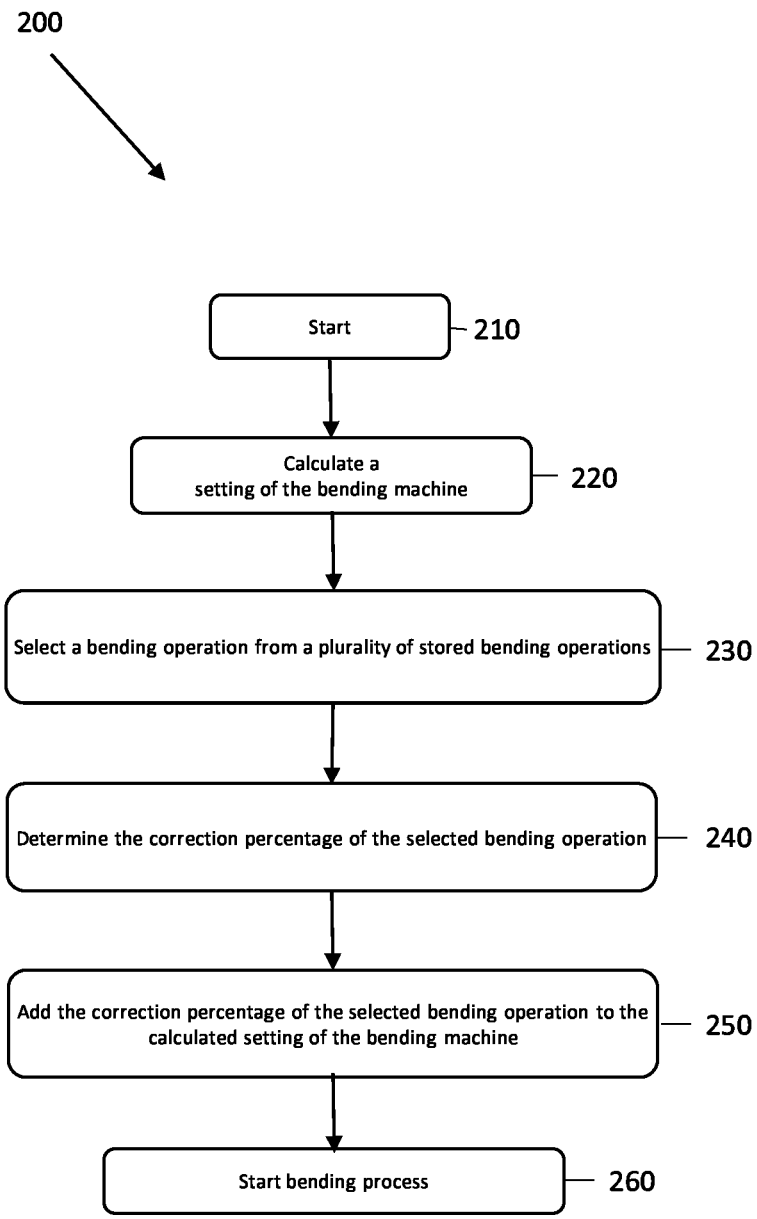

FIG. 2 shows the steps of a method 200 for determining at least one setting of a bending machine for a bending step, in particular for a bending step of an iterative multi-pass bending operation.

After the start 210 of the process, at least one adjustment of the bending machine is calculated by a method in step 220 on the basis on the properties of the sheet. The properties of the sheet include the geometric properties of the sheet, including, inter alia, the geometric dimensions of the sheet, as well as the material and bending properties of the metal sheet as far as they are known. In one embodiment, the machine settings can be calculated by means of the method described in DE 10 2017 122 073.9. The at least one adjustment of the bending machine may, in a preferred embodiment, be the position of a side roller of the bending machine. In particular, in an out-bending operation, the at least one bending machine setting may be or include the position of the outlet-side roller of the bending machine. Below, the desired machine setting is the position of the outlet-side side roller in an out-bending operation so that the determination of a machine setting is described as an example of the position of the outlet-side side roller.

In the next step 230, a data set is selected from a plurality of stored data sets about previous bending operations on the basis of the current curvature of the sheet and the curvature to be achieved. In a preferred embodiment, each of the stored data sets comprises the parameters of the sheet and the settings of the bending machine that were used for a previously performed bending operation. The stored parameters of the sheet include, in one embodiment, the curvature of the sheet before and after the bending step and the settings of the bending machine that are used include the lower roller pressure as well as the position of the side roller. At least one stored setting of the bending machine comprises a correction component so that the stored value has a calculated component and a correction component. The stored data sets about previous bending operations are therefore referred to hereinafter as corrected data sets. The stored data sets about the previous bending operations may be stored in the memory of the bending machine controller.

In a preferred embodiment, the closest stored data set of a bending operation is selected with the difference between the curvatures of the searched and the correspondingly stored bending machine setting of the stored data set being considered for the selection. This selection will be explained in more detail below with reference to FIG. 3.

Figure 3:
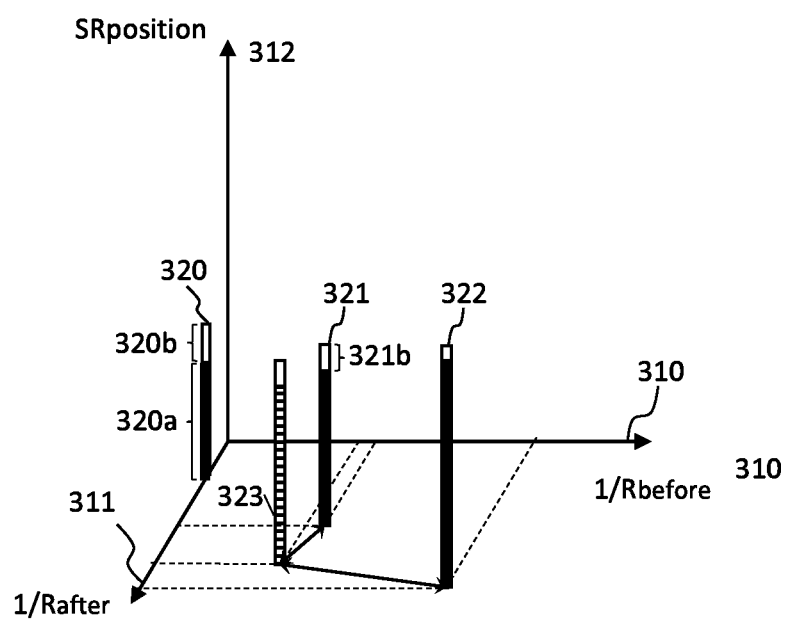

FIG. 3 shows a schematic representation of a plurality of stored data sets of previous bending operations. In a preferred embodiment, the data sets include the settings of a bending machine and information about the sheet before and after the bending operation. The stored settings include, in particular, the positions of side rollers, in particular for a bending operation in a multi-pass bending operation, in particular in an out-bending operation as well as information about the bent sheet metal. The details of the bent sheet metal include at least the curvature of the sheet before and after the bending operation and the other properties of the sheet that are relevant for the bending process such as the geometric dimensions of the sheet, which may be identical for a batch of sheets.

FIG. 3 illustrates a variety of data from previous bending operations where examples of positions of side rollers are graphically illustrated. In the illustrated coordinate system, the values entered are not to scale.

On the right-pointing axis 310 of the coordinate system, the curvature $1/R_{before}$ of the sheet is removed before the bending operation, the curvature here being the reciprocal of the bending radius $R_{before}$ before the bending operation. On the axis 311, the measured curvature $1/R_{after}$ of the sheet is removed after the bending process, wherein $R_{after}$ denotes the radius of the sheet after the bending operation. On the upwardly pointing axis 312 $SR_{position}$, the position of the side roller that was used in a previous bending operation is entered.

In the embodiment shown, data from three bending operations with their respective side roller position 320-322 is already known and stored in readable form.

Each stored side roller position 320-322 is divided into a calculated component and an added correction value. For the side roller position 320, the calculated component of the side roller position is identified in FIG. 3 as 320a and the correction value as 320b so that the stored side roller position value is composed of the calculated component 320a and a correction value 320b. It should be noted that the correction values may be positive or negative values with only positive values being shown in FIG. 3 for the purpose of illustration.

The calculated component is calculated on the basis of the curvature before and after the bending operation and on the basis of further variables defining the bending operation such as, for example, the outlet-side bending and the lower roller pressure. The added correction value was determined empirically. The correction value is determined by subtracting the calculated side roller position from the side roller position set during the bending operation.

In a first step to correct a calculated value of a side roller position, i.e. a bending machine setting, for a desired new bending operation, the stored data set of a bending operation is determined that comes closest to the desired bending operation in plane formed by the axes $1/R_{before}$ and $1/R_{after}$.

This can be done by determining the geometric distance of the values in the plane formed by the two axes.

In a preferred embodiment, the closest side roller position with a larger bending radius, i.e. a smaller curvature, is determined. This increases the probability that in the upcoming bending operation the sheet is not overbent, i.e. that its curvature does not become too large, which could not be corrected or only with great effort. If the curvature achieved after the bending operation is not yet adequate, however, the curvature can be increased in another bending operation.

In the embodiment shown schematically here, the bending machine setting is to be determined for a given initial curvature and a desired target curvature 323. For this purpose, first the setting of the bending machine, here the position of the side roller, is calculated, see 220 in FIG. 2. Then, based on the curvature before and after the bending operation ($1/R_{before}$ and $1/R_{after}$), one of the closest bending operations is selected from the stored data sets of previous bending operations, step 230 in FIG. 2. Subsequently, the correction component 321b of the selected data set is determined for the desired bending operation 323, step 240 and added to the calculated value of the bending machine setting, i.e. the correction component 321b of the selected (data set of a) bending operation 321 is used as a correction value for the correction of the calculated bending machine setting 323, Step 250, as described below as well. In this way, the calculated bending machine setting 323 is corrected for the correction component of a stored bending operation, which results in a corrected calculated machine setting.

The stored data sets of bending operations, which must be present before the selection of the closest value, can be determined by means of any method, but these must have a special batch of sheets with individual bending properties.

In a preferred embodiment, the stored data sets of bending operations are determined individually for a batch of sheets, for example, in a multi-pass operation with 3 bending operations, with the first two bending operations being used to collect the data on bending operations and the third bending operations performing the correction of the closest (in this case the second) bending operation. The bending method, here the out-bending and the lower roller contact pressure, can preferably be kept constant when determining the stored corrected values.

In a preferred embodiment, the stored data on bending operations may be stored in the form of the table shown schematically below and in any digital format.

|   | Rbefore | Rafter | Measured side roller position | Bending method | Pressure of the lower roller | Correction value |
|---|---------|--------|-------------------------------|----------------|------------------------------|------------------|
| 1 | 479.232 | 330    | 174.375                       | Out-bending    | 200                          | 1.2508           |
| 2 | ...     | ...    | ...                           | Out-bending    | 200                          | ...              |

Referring again to FIG. 2, after a data set of a bending operation, here the closest bending operation 323, has been selected from the plurality of stored data sets on bending operations, the bending machine setting calculated in step 220 is corrected for the correction value of the selected data set, step 240. Accordingly, the calculated value 323, here the calculated side roller position 323, is corrected for the correction component 321b of the value 321 of the selected closest stored data set, i.e. the correction component of the selected closest data set is added to the calculated bending machine value so that a corrected calculated value is obtained, step 250.

In the next step, the bending machine is adjusted for the next bending operation in accordance with the corrected calculated value of the bending machine setting. With the setting thus determined, the bending operation, in particular a next bending operation of a multi-pass operation, can then be carried out, step 260.

After one of several bending operations of a multi-pass operation has been performed, the bending machine setting can be determined with the method described above for a next desired curvature of a sheet.

It was found that the method described above has very good results, even with only a few stored corrected bending machine settings, and the bending machine settings can be adjusted very quickly for the properties of a batch of sheets with only a few test bending operations.

The invention claimed is:

1. A method for controlling a bending machine configured to bend sheet metal, wherein the bending machine has at least one upper roller, one lower roller, and a positionable side roller, the method comprising:
   calculating at least one bending machine setting based at least on properties of a first sheet of sheet metal that is to be bent;
   selecting a data set from a plurality of data sets, each storing at least one setting of the bending machine, a before curvature, an after curvature, and a correction value of a second sheet of sheet metal corresponding to a previous bending operation, the before curvature and after curvature of the second sheet in the selected data set being closest to respective before curvature and desired after curvature of the first sheet that is to be bent;
   retrieving the correction value from the selected data set;
   correcting the calculated at least one bending machine setting based on the correction value;
   setting the bending machine based on the corrected calculated at least one bending machine setting; and
   causing the bending machine to bend the first sheet based on the corrected calculated at least one bending machine setting, reducing a total number of bending passes required for the first sheet to achieve the desired after curvature.

2. The method according to claim 1, wherein the at least one bending machine setting includes a roller position.

3. The method according to claim 1, wherein the selected data set is a closest lower curvature.

4. The method according to claim 1, wherein the stored data sets based on previous bending operations are obtained and stored during a multi-pass bending operation performed previously.

5. The method according to claim 1, wherein the stored data sets are based on previous bending operations performed on a batch of sheets.

6. The method according to claim 1, wherein calculating at least one bending machine setting comprises an iterative finite element method.

7. The method according to claim 1, wherein the plurality of data sets are stored in a digital data memory.

8. A controller for controlling a bending machine with at least three rollers, which can be positioned relative to one another and with a digital signal processor, wherein the controller is configured to carry out the method according to claim 1.

9. A bending machine with at least three rollers which can be positioned relative to each other, wherein the bending machine has a controller according to claim 8.

* * * * *